United States Patent [19]

Tindall et al.

[11] 4,282,507

[45] Aug. 4, 1981

[54] MEASUREMENT OF TEMPERATURE

[75] Inventors: Richard F. Tindall, Newcastle; Eric R. Baddeley, Alsager; Peter W. Rudd, Newcastle, all of England

[73] Assignee: Johnson, Matthey & Co., Limited, London, England

[21] Appl. No.: 942,130

[22] Filed: Sep. 13, 1978

[30] Foreign Application Priority Data

Sep. 13, 1977 [GB] United Kingdom ............... 38125/77

[51] Int. Cl.³ .............................................. H01C 7/04
[52] U.S. Cl. ....................................... 338/25; 338/26; 338/28; 338/307
[58] Field of Search ....................... 338/25, 26, 28, 307

[56] References Cited

U.S. PATENT DOCUMENTS

| | | | |
|---|---|---|---|
| 3,286,214 | 11/1966 | Kolb | 338/28 X |
| 3,406,366 | 10/1968 | Kontimas | 338/25 |
| 3,416,971 | 12/1968 | Hutkin | 338/26 X |
| 3,564,474 | 2/1971 | Firth | 338/25 |
| 3,781,749 | 12/1973 | Iles | 338/25 |
| 3,845,443 | 10/1974 | Fisher | 338/25 |
| 4,103,275 | 7/1978 | Diehl | 338/307 X |
| 4,146,957 | 4/1979 | Toenshoff | 338/25 X |

FOREIGN PATENT DOCUMENTS 2801720  7/1978  Fed. Rep. of Germany ............ 338/25

Primary Examiner—Richard R. Kucia
Attorney, Agent, or Firm—Cushman, Darby & Cushman

[57] ABSTRACT

This invention relates to devices for measuring temperature; more particularly it relates to temperature sensing devices operating at high temperature. It is an object of this invention to overcome deterioration of temperature sensitive elements and accordingly the element of the invention comprises a substrate made from an electrically non-conducting material and carrying an electrically conducting path comprising a vitreous phase which is resistant to chemical reduction and loaded with electrically conducting particles.

9 Claims, 3 Drawing Figures

MEASUREMENT OF TEMPERATURE

This invention relates to devices for measuring temperature; more particularly it relates to temperature sensing devices operating at high temperatures.

In British Pat. No. 1,415,644 dated Nov. 10th 1972 there is described a temperature sensitive element for use as part of a resistance thermometer comprising a substrate made from an electrically non-conducting material and carrying an electrically conducting tortile path made from fused vitreous material loaded with electrically conducting particles, the electrically conducting particles being made from a metal selected from the group consisting of gold, silver, ruthenium, rhodium, palladium, iridium, platinum, iron, nickel, cobalt and copper.

BRIEF DESCRIPTION OF THE DRAWINGS

Such a device is illustrated in FIG. 1 of the accompanying drawings in which the tortile path and the substrate are designated 10 and 12 respectively and electrical terminals are designated 14. Ceramic tubes and seals are shown in FIGS. 2A and 2B.

It is normally considered appropriate to cover the conducting paths deposited upon the ceramic substrate of such a device with a protective glaze. However, in some environments, for example inside furnaces or ovens, there is a need to further protect the temperature sensitive element and one way of so doing is to enclose the element in a blind-ended stainless steel tube. In this case the element would be elongated rather than the square configuration illustrated in FIG. 1. The element is inserted into the tube and the tube is typically packed with a ceramic powder of high thermal conductivity, for example, alumina. Insulated lead-out wires are provided together with suitable terminal arrangements outside the tube. The open end of the tube is sealed with a cement or adhesive compound to hold the packing in place and to anchor the terminal arrangements. This seal often prevents the movement of gas to and from the interior of the tube and arrangements can be made to vent the tube contents. Such arrangements are not, however, always considered appropriate.

We have observed that when sealed in stainless steel tubes the above described elements do not function satisfactorily. It is thought that this may be due to the evolution of gases occluded in the steel, to the take-up of oxygen by the walls of the chamber or to the decomposition of vapours, e.g. water vapour, present in the chamber before sealing. Whatever the cause, we have now discovered that the resulting gases react with the vitreous phase of the conducting film and the protective glaze of the element. The harmful effect of this reaction is demonstrated by re-measuring the Ro (i.e. the resistance at 0° C.) value after operation of the element in a sealed stainless steel tube over a period of hours at a temperature between 300° C. and 600° C. For instance, two devices made by printing in accordance with our earlier patent BP No. 1415644 and insulated with a devitrifying glass layer of a type commonly used in the micro-electronics industry were sealed into steel tubes in the way described above. The thermometer probes thus made were heated in a muffle. The indicated temperature was 450° C.

The ice point resistance of the thermometers was noted before and after two hours at this temperature. After the first test the thermometer probes were returned to the muffle for a further 17 hours test. The changes in resistance we observed were:

| Time | 2 hours | 19 hours |
|---|---|---|
| Sample 1 | +.49% | +.26% |
| Sample 2 | +.15% | +.15% |

These changes are large enough to cause the thermometers to fall outside the requirements of British Standard No. 1904.

At the same time as this experiment was carried out, a similar one was conducted. In this case the printed detectors were made by printing a dispersion of platinum which contained no vitreous material. No insulating layer was used on these devices. They were made up as thermometer probes and tested in the same way as that described above. The changes in resistance were:

| Time | 2 hours | 19 hours |
|---|---|---|
| Sample 1 | −.01% | −.01% |
| Sample 2 | −.02% | −.02% |

These small changes are insufficient to cause the thermometer probe to be out of calibration.

Although it is feasible to make platinum resistance temperature detectors as described above using a platinum film in which there is no vitreous component it is not always convenient to do so. Such films under some circumstances may be insufficiently robust or exhibit inadequate adhesion to the substrate.

Another method by which the degradation of glass-containing films can be prevented is to vent the steel tube in the way mentioned earlier.

Figure 1:
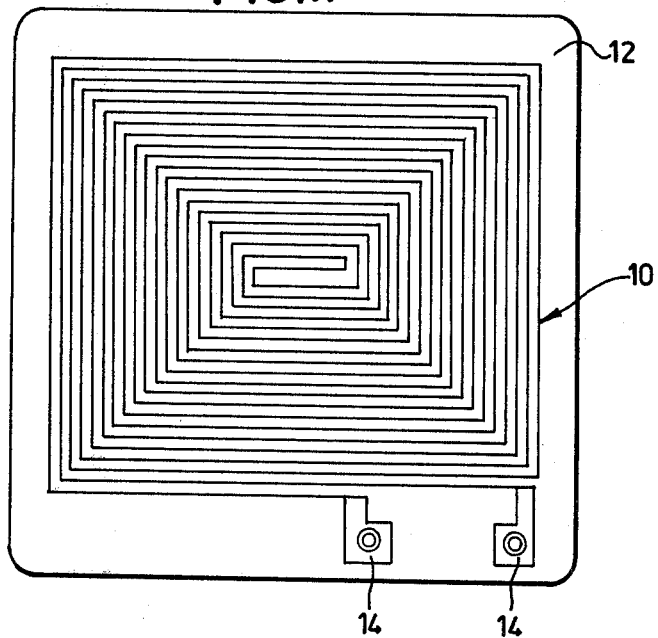
Figure 2A:
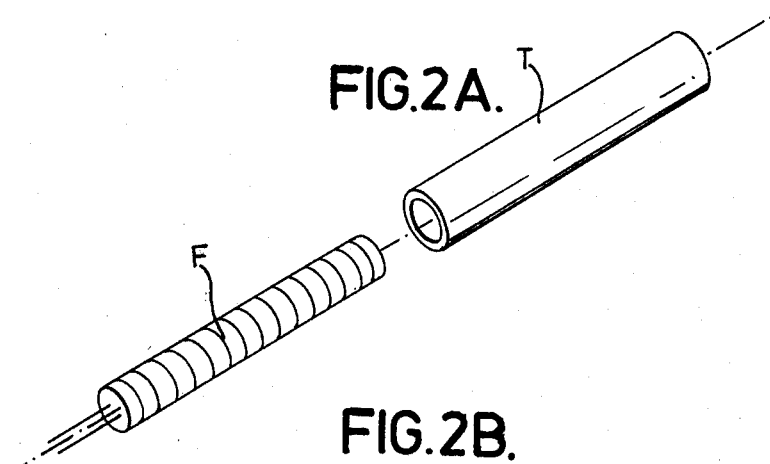
Figure 2B:
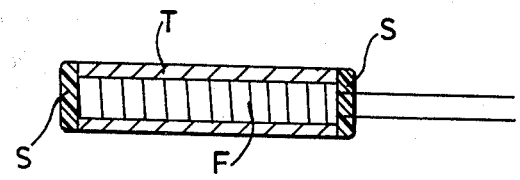

A further method is to provide a protective layer over the platinum film which is effectively impervious to gases. This may be achieved most easily when a cylindrical former F is used by enclosing the detector in a concentric glass or ceramic tube and providing a seal S at the end thereof as shown in FIGS. 2A and 2B of the accompanying drawings.

Such a covering tube may be inconvenient, particularly when a rapid thermal response time is required. Cover glasses which can be applied in paint form and fired on to give very thin coatings usually do not give a completely non-porous film. It is, therefore, desirable to make a detector which will operate satisfactorily in a sealed steel tube without unusual precautions.

It is an object of the present invention to prevent the above-described deterioration of temperature sensitive elements when sealed in metallic containers for use whilst retaining a proportion of vitreous material in the platinum film to provide good adhesion to the substrate and avoid the necessity for a special sealed protective layer.

According to a first aspect of the present invention, a temperature sensitive element for use as part of a resistance thermometer comprises a substrate made from an electrically non-conducting material and carrying an electrically conducting path, for example, a tortile path in the form of a film deposited thereon, said path consisting essentially of a vitreous phase which is resistant to chemical reduction and loaded with electrically conducting particles. Similarly, if a protective coating or deposit of glaze is present it is composed preferably of materials which are particularly resistant to chemical reduction. The electrically conductive particles present in the conducting path are preferably made from a metal selected from the group consisting of Au, Ag, Ru, Rh, Ir, Pt, Fe, Ni, Co and Cu of which platinum is the most preferred material.

According to a second aspect of the present invention, an article for use in the measurement of temperature comprises a metallic container enclosing a temperature sensitive element with electrical connections for the measurement of its resistance in which at least a part of the said element has a protective coating a glaze which is resistant to chemical reduction.

The glaze and vitreous phase which we prefer each contain a glass material in which polyvalent metal ions are absent. Suitable glasses may be based on the alumino silicate or alumino borosilicate systems with the group IIA alkaline earth metals Mg, Ca, Sr, Ba or Zn as principal network modifiers. The more usually obtainable lead borosilicate glasses are unsuitable because they are unstable under reducing conditions. A platinum/glass printing ink was made up with the following composition:

particulate platinum—90 g
ethyl cellulose medium—8 g
Wetting agent—1 g
glass powder—5 g
B.C.A. solvent—0.5 (butyl carbitol acetate)

The glass powder used in the vitreous phase was a chemically stable material based on the glass system $RO.Al_2O_3.SiO_2$ where R is at least one of the elements Mg, Ca, Sr, Ba or Zn. The preferred composition was found to have the molar composition 27.94% $BaO.0.3.75\%$ $MgO.7.62\%$ $ZnO.4.11\%$ $Al_2O_3.55.85\%$ $SiO_2$. The glass system can also contain minor additions or $TiO_2$ and $ZrO_2$ to improve the chemical durability at approximately 3 mole % for each oxide. The preferred coefficient of linear thermal expansion $\alpha 20°-650°$ C. of the glass system was found to lie in the range 8.5 to $9.0 \times 10^{-6} °C.^{-1}$. The thermal expansion could be modified where necessary by adding $B_2O_3$ to the above system in the range 5 to 15 mole %. The resulting composition or ink was used to print a pattern onto an alumina substrate via a stencil on a stainless steel screen.

The pattern was in the form of two tortile paths side-by-side and connected at one end to produce a non-inductive array. The nominal width of the lines was 0.004" and the length of the track was 14".

After printing, the pattern was allowed to level, or flow out, at room temperature for about 15 minutes and was then dried by heating in an oven at 100° C. Following this the patterns were fired onto substrates by placing them in a cold muffle furnace and raising the temperature to 1200° C. for a period of two hours. After firing the thickness of the track was found to be about 20μ. The resistance of the conducting tracks thus formed was found to be 40Ω with a mean temperature coefficient of resistance of 0.003866° C.$^{-1}$.

The so printed conducting path or track was insulated with a glaze based on the glass system $RO.Al_2O_3.B_2O_3.SiO_2$ where R is at least one of the elements Mg, Ca, Sr, Ba or Zn. The preferred composition was where MgO was the principal network modifier in the range 5 to 35 mole %, in combination with either CaO, 5 to 15 mole % or SrO 5 to 15 mole %. For the network formers and intermediate oxides the preferred composition ranges were $Al_2O_3$, 2 to 15 mole %, $B_2O_3$ 5 to 25 mole %, $TiO_2$ 0 to 3 mole %, $ZrO_2$ 0 to 3 mole % and $SiO_2$ 30 to 60 mole %.

A typical molar composition of the glass would be: 16.36% MgO.8.26% CaO.2.37% $TiO_2.2.55\%$ $ZrO_2.12.94\%$ $Al_2O_3.18.98\%$ $B_2O_3.38.41\%$ $SiO_2$.

The preferred coefficient of linear thermal expansion $\alpha$ 20°-650° C. was found to lie in the range 4.5 to $5.0 \times 10^{-6} °C.^{-1}$.

The glazes outlined previously were predominantly stable glass systems. A glass-ceramic system where the glass was devitrified before application was also developed as an alternative to the stable glass type of glaze to minimise process changes and increase the chemical durability. This type of glaze was based on the previous glass system but ZnO was added, to promote devitrification, in the range 5 to 15 mole %.

A typical glass-ceramic molecular composition would be: 28.03% MgO.6.78% ZnO.3.66% $Al_2O_3.11.18\%$ $B_2O_3.49.67\%$ $SiO_2$.

The glass was devitrified by slow cooling during its preparation.

The preferred coefficient of linear thermal expansion 20°-650° C. was found to lie in the range 6.5 to $7.5 \times 10^{-6} °C.^{-1}$.

The powdered glaze was mixed with Zr $SiO_4$ to modify the flow properties before use. The whole was mixed with an organic medium to a paint-like consistency, applied by painting and firing to 860° C.

In the above example, the platinum/glass printing ink described yielded a mean temperature coefficient of 0.003866° C.$^{-1}$ with an approximately normal distribution around this value, exhibiting one stand derivation (o) of 0.000004° C.$^{-1}$ from a batch of 25 detectors. Hence, by reference to BS 1904, that a proportion of detectors from a batch produced in accordance with the process described above would be outside the limits of temperature coefficient (0°-100° C.) stated in BS 1904.

In a further embodiment of this present invention, Rhodium was added to the platinum/glass ink to modify the mean temperature coefficient, and thus exert control over the mean value in order to achieve a mean value which lies very close to 0.003850° C.$^{-1}$, thereby ensuring consistently high yields.

The temperature detectors thus made were made into thermometer probes in the way described earlier using a cylindrical former. Formers of other shapes e.g. square or rectangular may be used if desired.

After testing for 12 hours at a temperature of 500° the change in ice point resistance was −0.01% on one sample and −0.03% on another identical device whereas two otherwise similar conventional resistance thermometer probes, made using a borosilicate glass in the platinum and a proprietary cover glaze, had changed by +0.20% respectively.

Three further different formulations of cover glaze according to the general glass system $ROAl_2O_3B_2O_3SiO_2$ of the invention were tested after 250 hours and 1000 hours and the changes in RO are indicated in the following table.

| | After 250 hrs at 500° C. | | After 1000 hrs at 500° C. | |
| --- | --- | --- | --- | --- |
| Formulation | In Air | In stainless steel sheaths | In Air | In stainless steel sheaths |
| A | −0.023% | −0.038% | −0.044% | −0.050% |
| B | −0.049% | −0.015% | −0.85% | −0.032% |
| C | −0.053% | +0.002% | −0.089% | −0.013% |

Variations in the above formulation indicate process changes (i.e. change in detector resistance during cover-glaze firing) and these can be accommodated without causing an unacceptably high manufacture reject rate.

What we claim is:

1. A temperature sensitive element for use as part of a resistance thermometer which comprises a substrate made from an electrically non-conducting material and carrying an electrically conducting path comprising a vitreous phase loaded with electrically conducting particles, and a protective coating applied to the conducting path, the protective coating and the vitreous phase each containing a glass in which polyvalent metal ions are absent and which makes said coating and vitreous phase resistant to chemical reduction, the glass in said vitreous phase being one having the formula $RO.Al_2O_3.SiO_2$ where R is at least one of the elements Mg, Ca, Sr, Ba or Zn and the glass in said protective coating being one having the formula $RO.Al_2O_3.B_2O_3.SiO_2$ where R is at least one of the elements Mg, Ca, Sr, Ba or Zn.

2. An element according to claim 1, said vitreous phase having the molar composition: 27.94% BaO.3.75% MgO.7.62% ZnO.4.11% $Al_2O_3$.55.75% $SiO_2$.

3. An element according to claim 2 including minor additions of at least one of the compositions $TiO_2$ and $ZrO_2$ in the vitreous phase.

4. An element according to claim 1 including between 5 and 15 mole % $B_2O_3$ in the vitreous phase.

5. An element according to claim 1 wherein the glass material in said protective coating includes 5 to 35 mole % MgO.

6. An element according to claim 5 wherein the glass material in said protective coating also includes 5 to 15 mole % CaO or SrO.

7. An element according to claim 1 wherein the glass material in said protective coating has the molar composition: 2.55% $ZrO_2$.12.94% $Al_2O_3$.18.98% $B_2O_3$.38.41% $SiO_2$.

8. An element according to claim 1 wherein the electrically conducting particles are made from one or more metals selected from the group consisting of Au, Ag, Ru, Rh, Pd, Ir, Pt, Fe Ni, Co and Cu.

9. A temperature measuring device comprising a metallic container, an element according to claim 1 mounted within the container and electrical connections for the electrically conducting path to permit measurement of the resistance thereof.

* * * * *